US00RE37494B1

(19) United States
(12) Reissued Patent
Cantoni et al.

(10) Patent Number: US RE37,494 E
(45) Date of Reissued Patent: Jan. 1, 2002

(54) TRANSFER OF MESSAGES IN A MULTIPLEXED SYSTEM

(75) Inventors: Antonio Cantoni, North Perth (AU); Robert M. Newman, Santa Clara, CA (US)

(73) Assignee: QPSX Communications Pty. Ltd. (AU)

(21) Appl. No.: 08/122,934

(22) PCT Filed: Mar. 17, 1988

(86) PCT No.: PCT/AU88/00075

§ 371 Date: Apr. 28, 1989

§ 102(e) Date: Apr. 28, 1989

(87) PCT Pub. No.: WO88/07293

PCT Pub. Date: Sep. 22, 1988

Related U.S. Patent Documents

Reissue of:
(64) Patent No.: 5,050,166
Issued: Sep. 17, 1991
Appl. No.: 07/283,364
Filed: Apr. 28, 1989

(30) Foreign Application Priority Data

Mar. 17, 1987 (AU) ..... PI0884

(51) Int. Cl.[7] ..... H04J 3/24; H04Q 11/04; H04L 12/54

(52) U.S. Cl. ..... 370/395; 370/471; 370/474; 340/825.04; 340/825.52

(58) Field of Search ..... 340/825.03, 825.04, 340/825.05, 825.34, 825.44, 825.52; 371/55, 56, 67.1, 68.1, 71; 370/389, 395, 396, 397, 400, 409, 412, 428, 429, 465, 470, 471, 474

(56) References Cited

U.S. PATENT DOCUMENTS 3,988,545 A * 10/1976 Kuemmerle et al. ..... 370/83
4,156,798 A * 5/1979 Doelz ..... 370/94.1
4,168,469 A * 9/1979 Parikh et al. ..... 370/83
4,225,919 A * 9/1980 Kyu et al. ..... 364/200
4,354,252 A * 10/1982 Lamb et al. ..... 364/900
4,369,443 A * 1/1983 Giallanza et al. ..... 340/825.47

(List continued on next page.)

FOREIGN PATENT DOCUMENTS

EP 0055674 * 7/1982
EP 0079426 * 5/1983
EP 0212701 * 3/1987
GB 1326569 * 8/1973
GB 1427662 10/1974 ..... H04L/1/00

OTHER PUBLICATIONS

Conference Record from International Conference on Communications, Gadre, "Comparison of multiple access protocols for packet switching in satellite–switched multi–beam-systems," Jun. 18–20, 1980, Department of Electrical Engineering, Columbia University, New York, N.Y.; 8 pp.

Conference literatue from IEEE Infocom '86, Pavey et al., "A Performance Evaluation of the PDAMA Satellite Access Protocol" Apr. 8–10, 1986, E–Systems, Inc., ECI Division, St. Petersburg, FL; 12 pp.

Literature from IEEE International Conference on Communications '88, Wong et a;., "The Controlled–SRMA Protocol for Packet Satellite Communication", Jun. 12–15, 1988, Department of Electronics, The Chinese University of Hong Kong, Shatin, Hong Kong, 9 pp.

(List continued on next page.)

*Primary Examiner*—Alpus H. Hsu
(74) *Attorney, Agent, or Firm*—Fish & Richardson P.C.

(57) ABSTRACT

A method and apparatus for transmitting variable length messages on a network in fixed length slots including the provision of a source identifier field in the header of each slot, the source identifier field including a code which is uniquely associated with the message to be transmitted. The fixed length slots are then transmitted on the network and reassembly of the slots by a reassembly machine is controlled in accordance with the identifier codes in the slot.

39 Claims, 12 Drawing Sheets

U.S. PATENT DOCUMENTS

| | | | | | |
|---|---|---|---|---|---|
| 4,379,946 | A | * | 4/1983 | Mizuno et al. | 178/3 |
| 4,410,889 | A | * | 10/1983 | Bryant et al. | 370/82 |
| 4,517,669 | A | * | 5/1985 | Freeburg et al. | 370/82 |
| 4,570,257 | A | * | 2/1986 | Olson et al. | 370/94.1 |
| 4,703,475 | A | * | 10/1987 | Dretzka et al. | 370/60 |
| 4,774,706 | A | * | 9/1988 | Adams | 370/94.1 |

OTHER PUBLICATIONS

Literature, Chitre, "Capacity Allocation Scheme for Transmission of Packerts Over Satelitte Links", 1983, Communications Satellite Corporation 1983, 20 pp.

Literature, Benelli et al., "Integration of Random Access and Time Division Techniques in Satellite Communications" Universita Di Firenze, Italie; 5 pp.

Article, Ilyas et al., "Effects of Message Segmentation in Tadem–Mode Computer Networks" 1987, Computer Engineering, florida Atlantic University, Boca Raton, FL; 5 pp.

Literature, Limb et al., "Improved scheduling of traffic for a high–speedslooted ring," Electronics Letters Jul. 16, 1987, vol. 23, No. 15, 3 pp.

Literature, Kobayashi et al., "Satellite Packet Communication Architeture" C&C Systems Research Labs, NEC Corporation, 5 pp.

Literature, Flak et al., "A Multiprocessor Channel Scheduler for the Wideband Packet Satellite Network" 1983, Bolt Beranek and Newman Inc., Cambridge, MA, 8 pp.

Literature, Tasaka et al., "Performance Analysis of the SRUC Protocol with a Go–Back–N ARZ Scheme for Satellite Broadcast Channels" 1984, Department of Information Engineering, Nagoya Institute of Technology, Nagoya, Japan, 6 pp.

Literature, Takizuka et al., "Design and Evaluation of Satellite Packet Communication Protocols for Integrated Services Networks" 1983, KDD, Research and Development Laboratories, 6 pp.

Article, Li, "Multiple Access Communications Networks" IEEE Communications Magazine, Jun. 1987, vol. 25, No. 6, 8 pp.

Literature, Bolus, Fallour et al., "Computer Protocols and Applications Using Satellite Networks: THE NADIR Project" Computer Science Press, Inc., 18 pp.

Literature, Chlamtac et al., "Performance of Multibeam Packet Satellite System with Conflict Free Scheduling" 1986, Department of Computer Sceince, Technion–Israel Institute of Technology, Haifa, Israel, 8 pp.

Literature, Koubias et al., "A New Mulitple Access Protocol and its Simulated Performance" Applied Electronic Laboratory, School of Engineering, University of Patras, Greece, 7 pp.

Literature, Lam, "Protocols for Satellite Packet Switching" Department of Computer Sciences, The Unievrstiy of Texas at Austin, Austin, Texas, 6 pp.

Literature, Jacobs et al., "Packet Satellite Network Design Issues" 1979, LINKABIT Corporation, San Diego, CA, 12 pp.

Literature, Mukherjee et al., "Multichannel Dynamic Satellite Packet Networkd for Computer Databanks" 1983, Southern Illinois University, Carbondale, 3 pp.

* cited by examiner

FIG 7
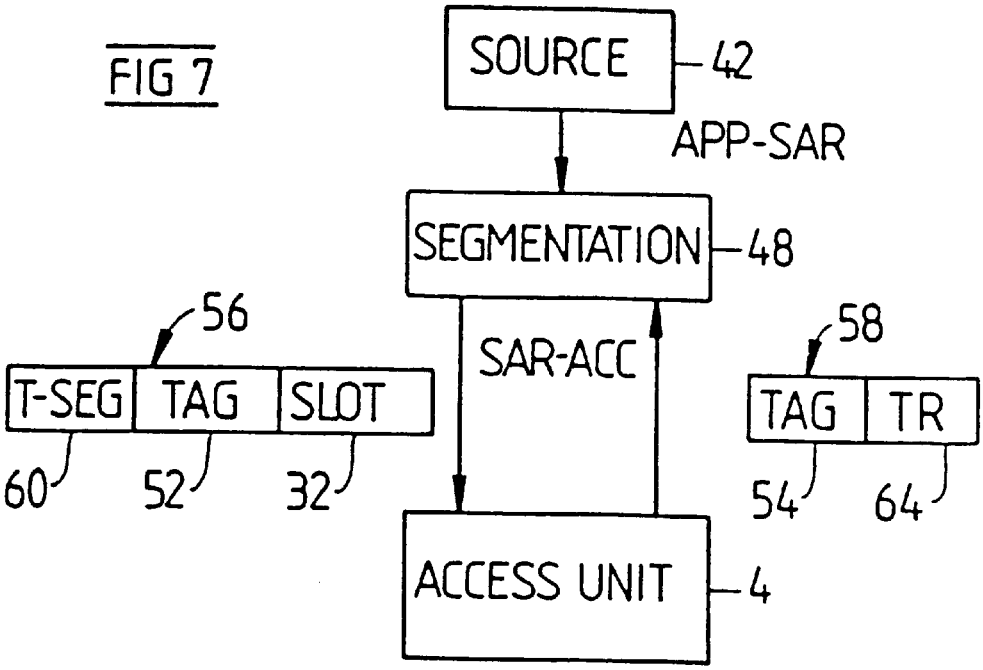
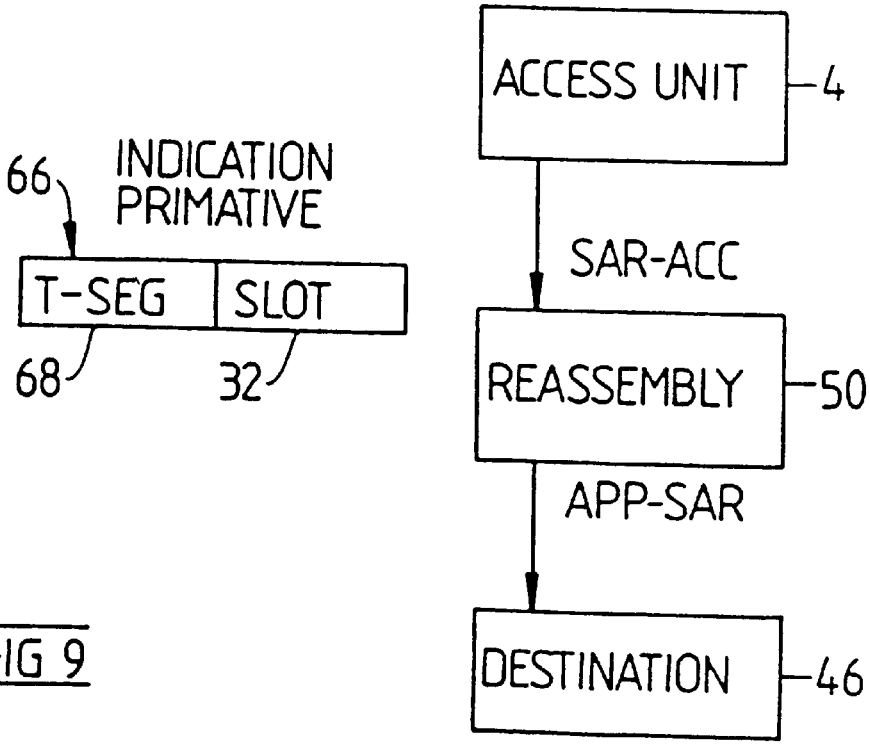
FIG 9

TRANSFER OF MESSAGES IN A MULTIPLEXED SYSTEM

Matter enclosed in heavy brackets [ ] appears in the original patent but forms no part of this reissue specification; matter printed in italics indicates the additions made by reissue.

This invention relates to a transfer of messages in a multiplexed system.

More particularly, the invention relates to a method for the transfer of messages in a time multiplexed slotted environment such as a communications network. The network can be of the type disclosed in International Publication No. WO 86/03639 and that disclosure is incorporated herein by cross-reference.

Generally speaking, the invention provides an efficient method for the connectionless or connection oriented transfer of messages of arbitrary but finite length in a time multiplexed slotted environment with constrained destination resources.

The method provides for the efficient support of any type of addressing (short or extended, hierarchical or non-hierarchical) in the one environment, even in a system with short slots.

In the one environment, the method can guarantee delivery of messages or provide a more efficient transfer at the expense of occasional message loss. In either case, there are minimal communication overheads and the utilisation of destination resources is maximised. Thus the method provides a wide range of options and considerable scope for achieving a range of performance-cost objectives.

BACKGROUND ART

In the data communications environment, information is generally exchanged in units called packets. These consist of an overhead necessary for the control and addressing of the unit through the data switch and of the actual information. Typically the size of the information unit is not fixed but depends upon the message and the amount of information to be transferred.

Early packet switches handled the variable length packets as a whole unit, allocating all its communication resource to the transfer of the packet until its completion. There are a number of new packet switch designs emerging that switch only small fixed length slots. These switches are commonly referred to as Fast Packet Switches. Such switches are an improvement since they are generally simpler, may operate at higher speeds and allow for the support of real-time traffic.

If the Fast Packet Switch is to carry packet communications of variable length then it is necessary that the original packet message be segmented for transmission over the switch and reassembled at the destination. The segmentation function is relatively simple only requiring that the message be divided into units of size equal to or smaller than the slot size. The transmission of the segments over the packet switch however requires much more since it is necessary that the destination can receive and order all of the segments of the message. Thus it is required that there be a logical association between all of the slots of a single message. The reassembly function then reconstructs the original variable length message from all of the received segments. Special care may need to be taken in the reassembly function to allow for the possibility that more than one message may need to be reassembled concurrently.

Some schemes have been developed to perform the segmentation and reassembly function. However, these are limited either in the efficiency of the transport in the switch or in the performance of the reassembly function. The efficiency of the transport is typically limited by the overheads that are carried on each slot. These overheads are required to route the slot to the destination and to control the reassembly of the message at the destination. An example of this is the Slotted Ring protocol where 13 bytes of overhead are required in each slot as described in I.E.E.E. 802.6 Draft Standard Proposal "Slotted Ring" Sept. 1986. The overheads in that case include addressing, sequence indication, and length indication.

The problem with the slot overhead is compounded by addressing requirements. The common address field sizes used in data communications are 16 to 48 bits. With 48 bit addressing there is an overhead of 12 bytes per slot (source and destination address) in addition to the reassembly overheads. This approach to segmentation is clearly inefficient with small (less than 32 bytes) slot sizes.

The overhead problem can be reduced by logically associating the segments of the same message by the use of a count scheme, as suggested in an article by K. Yukimatsu, N. Watanabe, T. Honda "Multicast Communication Facilities in a High Speed Packet Switching Network", Proc. ICCC 86 Munich Sept. 1986. pp 276–281. In this approach the segments of the message are transmitted with a two octet i.e. 16 bits overhead, a count field. The count field gives the number of slots separation between two consecutive segments of the same message. By the use of this count the destination can determine all slots of the message. The limitation with this approach is that the number of slots between consecutive segments of the message is limited by the maximum value of the count field. Also, in the case of a multiple access switch, the source cannot transmit more than one message at a time. This reduces the efficiency of transfer when connection orientated reassembly schemes are used.

BRIEF DESCRIPTION OF THE INVENTION

According to the present invention there is provided a method of transmitting variable length messages on a network from a source to a destination in fixed length slots which include a header field and a message segment, said method including the steps of providing a source identifier field in the header field of each slot, said source identifier field including a source identifier code which is uniquely associated with the message to be transmitted, transmitting the slots on the network, and controlling the reassembly of slots at the destination in accordance with the source identifier codes of the slots received at the destination.

The invention also provides an apparatus for transmitting variable length messages on a network from a source to a destination in fixed length slots said apparatus including:

a segmentation machine for segmenting the message into fixed length slots which include a header field and a message segment, said machine including coding means for providing a source identifier field in the header of each slot, said source identifier field including a source identifier code which is uniquely associated with the message to be transmitted, and a reassembly machine located, in use, at the destination, said reassembly machine including control means for controlling reassembly of slots in accordance with the source identifier codes of the slots.

BRIEF DESCRIPTION OF THE DRAWINGS

FIG. 7 is a diagram showing request and confirm primatives for segment transfer to the access unit;

FIG. 9 is a diagram showing an indication primative for segment transfer from an access unit;

DETAILED DESCRIPTION OF THE EMBODIMENTS OF THE INVENTION

Figure 1:
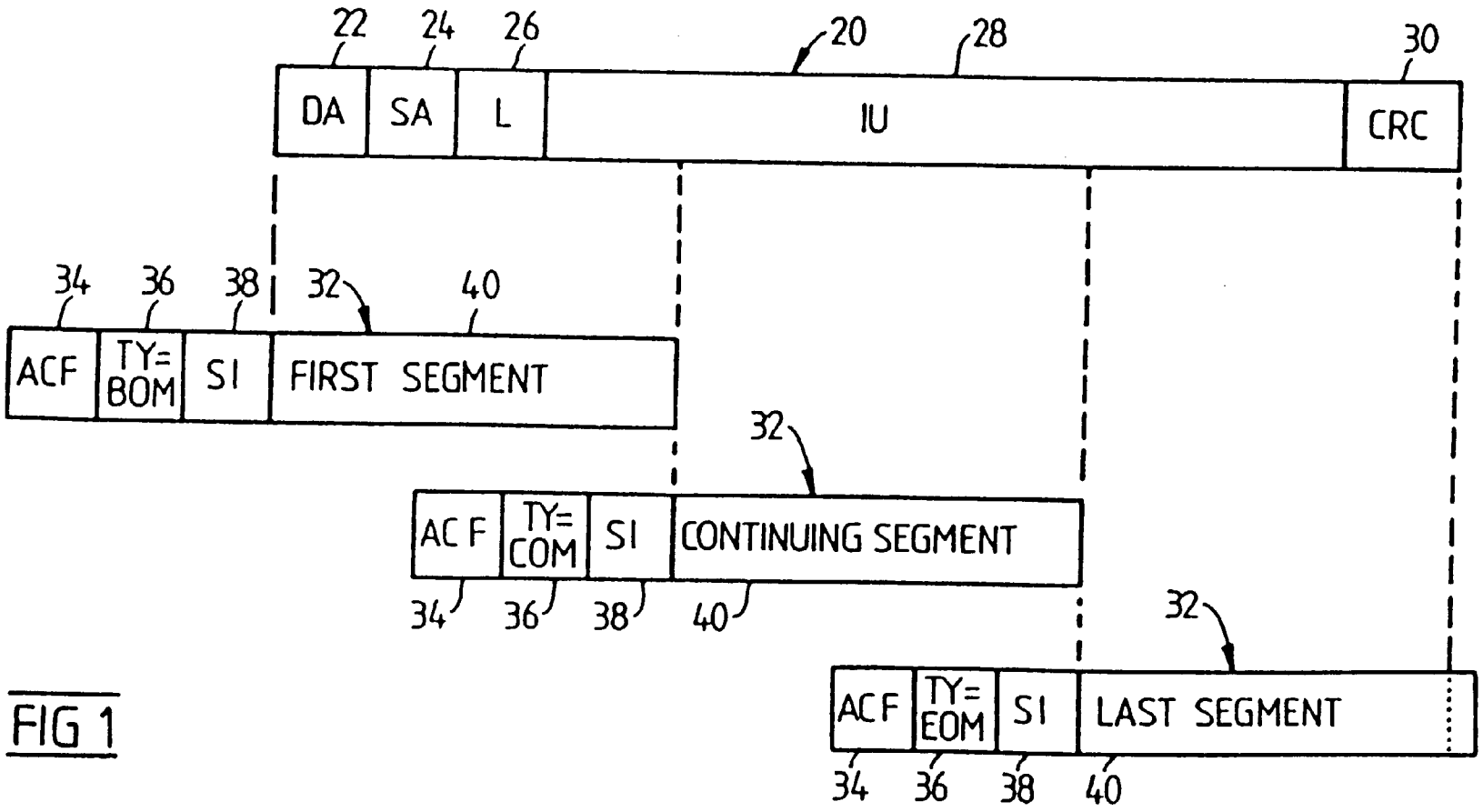
FIG. 1 is a diagrammatic representation showing a variable length message and fixed length segments.

FIG. 1 diagrammatically shows a message 20 which is of variable length. The message includes address fields 22 and 24 for the destination address (DA) and source address (SA). The message includes a length field (L) 26 and an information field (IU) 28 followed by an error checking field (CRC) 30. The error checking field 30 can be of any known type.

In accordance with the invention, the variable length message 20 is segmented into a number of slots 32 of equal length. The method places the address field 22 and 24 in the first of the slots 32 and subsequently logically associates the following slots of the message with the first slot using a unique identifier, as is diagrammatically illustrated in FIG. 1.

Each slot 32 has an Access Control Field (ACF) 34, TYPE field 36 and Source Identifier (SI) field 38. In accordance with the invention, the SI field 38 is used to provide the logical linking between slots 32 of the same message. The slots 32 also include an information field 40 which is used to carry information from the original message 20. The ACF 34 is related to controlling transmission of the slots through the network.

The TYPE field 36 within the slot can be used for the indication of a wide range of information. In one use it can allow for the separation of different communication classes within the one environment. As an example the messages with different field sizes and structures could be carried on the same switch. Also the TYPE field can be used to identify between different slot structures. Other segmentation schemes such as those described in the Background Art could be used in the same environment and distinguished by the TYPE field.

The TYPE field specifies how the SI field 38 and the information field of each slot should be interpreted depending on, among others, the following factors:

(a) Whether connectionless or connection oriented communication is supported.

(b) Whether short or long source and destination addresses are to be supported.

(c) Whether extended hierarchical or non hierarchical source and destination addressing is supported.

(d) Whether the slot is carrying the first, last or continuation segment of a message.

(e) Whether the message fits in a single segment.

(f) Whether or not the source supports message transmission to multiple destinations concurrently.

The SI field 38 is a label which enables the logical association of all segments 40 belonging to the one message and hence enables them to be reassembled into the original message 20.

Figure 2:
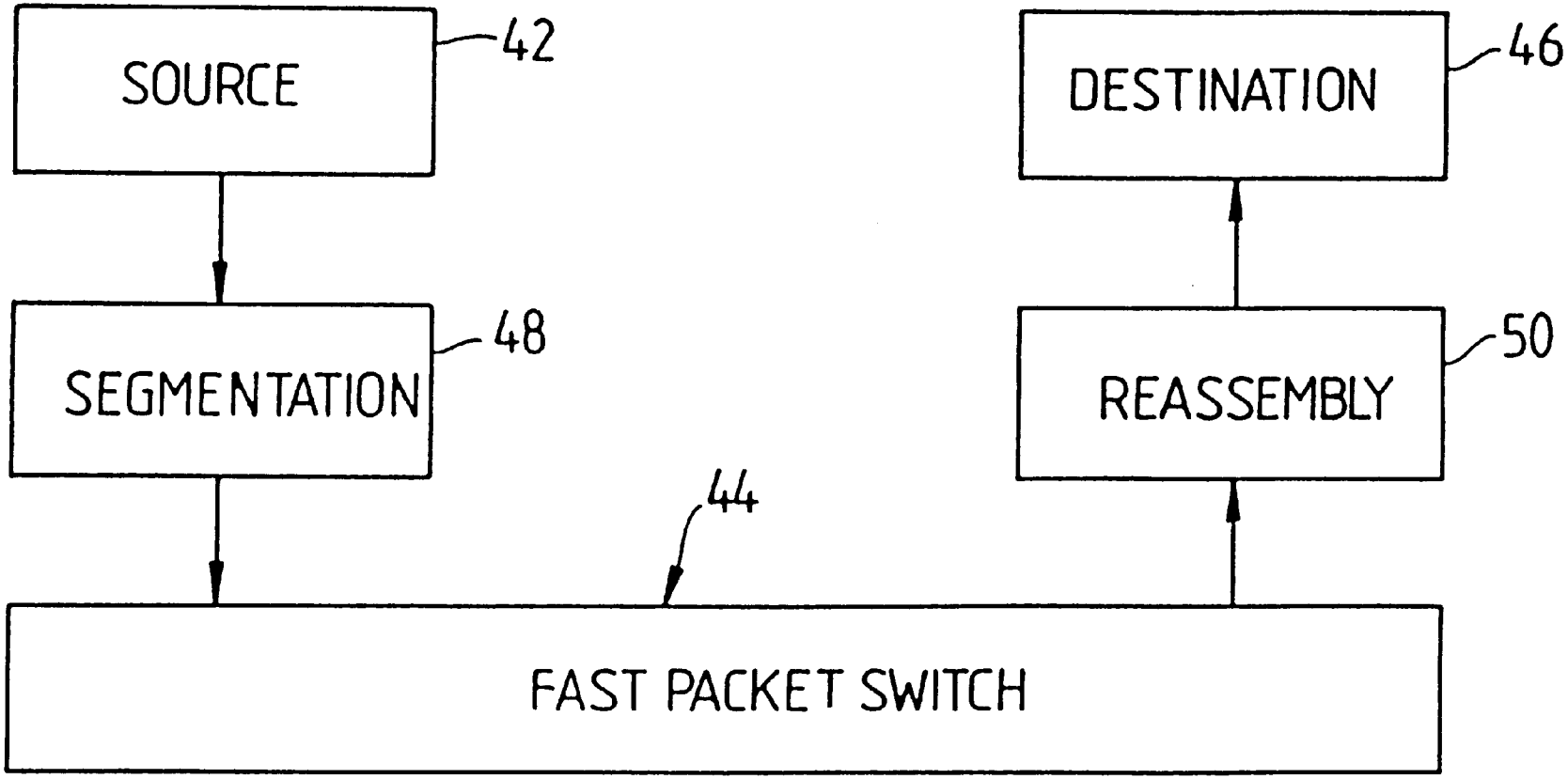
FIG. 2 is a block diagram showing the segmentation and reassembly machines coupled to a fast packet switch.

FIG. 2 diagrammatically illustrates a communications system comprising a source 42 which produces messages 20 of variable length for transmission on a network or fast packet switch 44 to a destination 46. The system includes a segmentation machine 48 coupled between the source 42 and the switch 44 and a reassembly machine 50 coupled between the switch 44 and the destination 46. The segmentation machine 48 converts messages 20 of indefinite length to slots 32 of fixed length for transmission on the switch 44. The reassembly machine 50 reassambles the slots 32 into the original message 20 for input to the destination 46. The segmentation and reassembly machines 48 and 50 would be located at respective nodes or access units coupled to the network.

Figure 3:
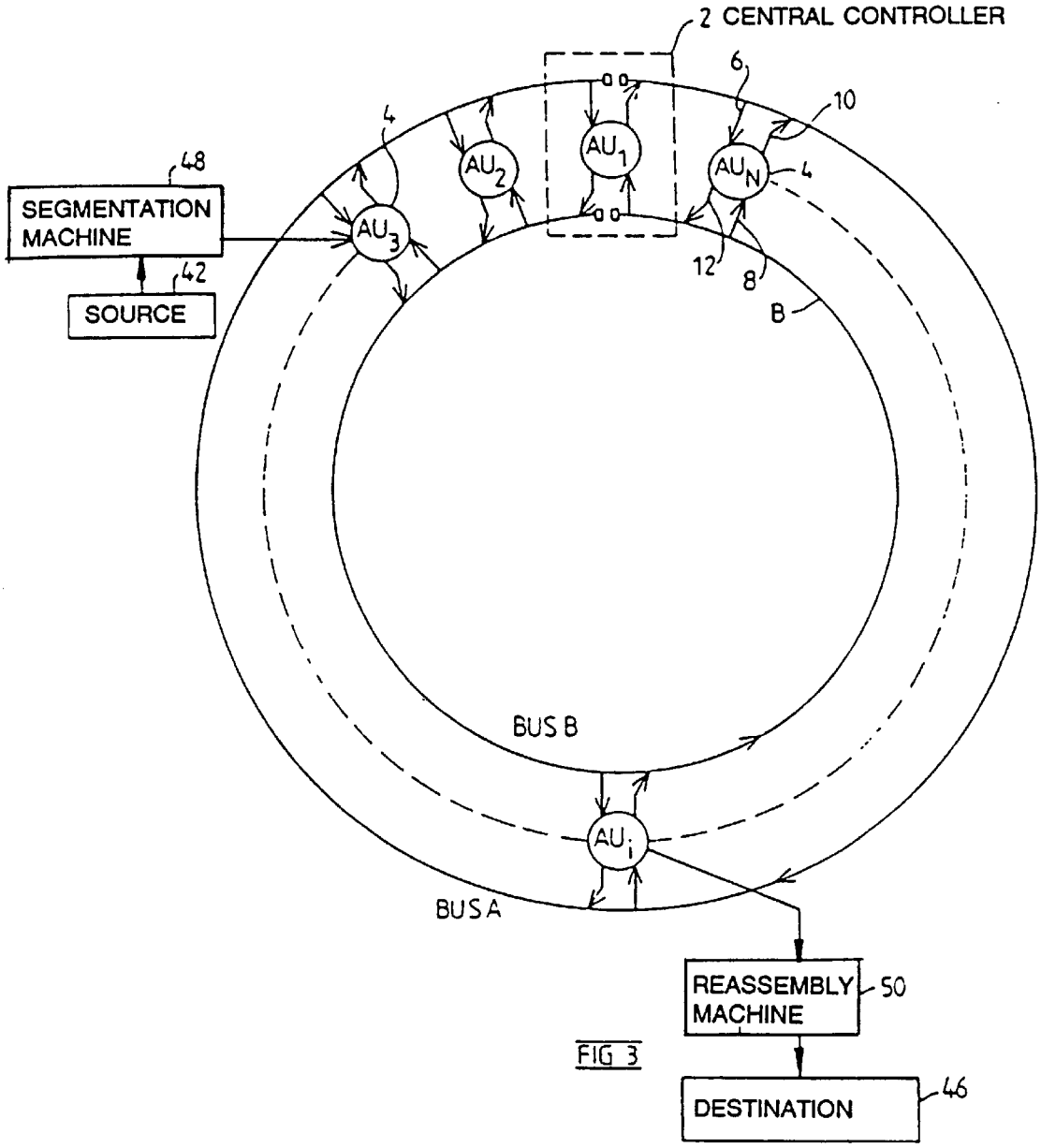
FIG. 3 diagrammatically illustrates the segmentation and reassembly machines coupled to a QPSX network.
Figure 4:
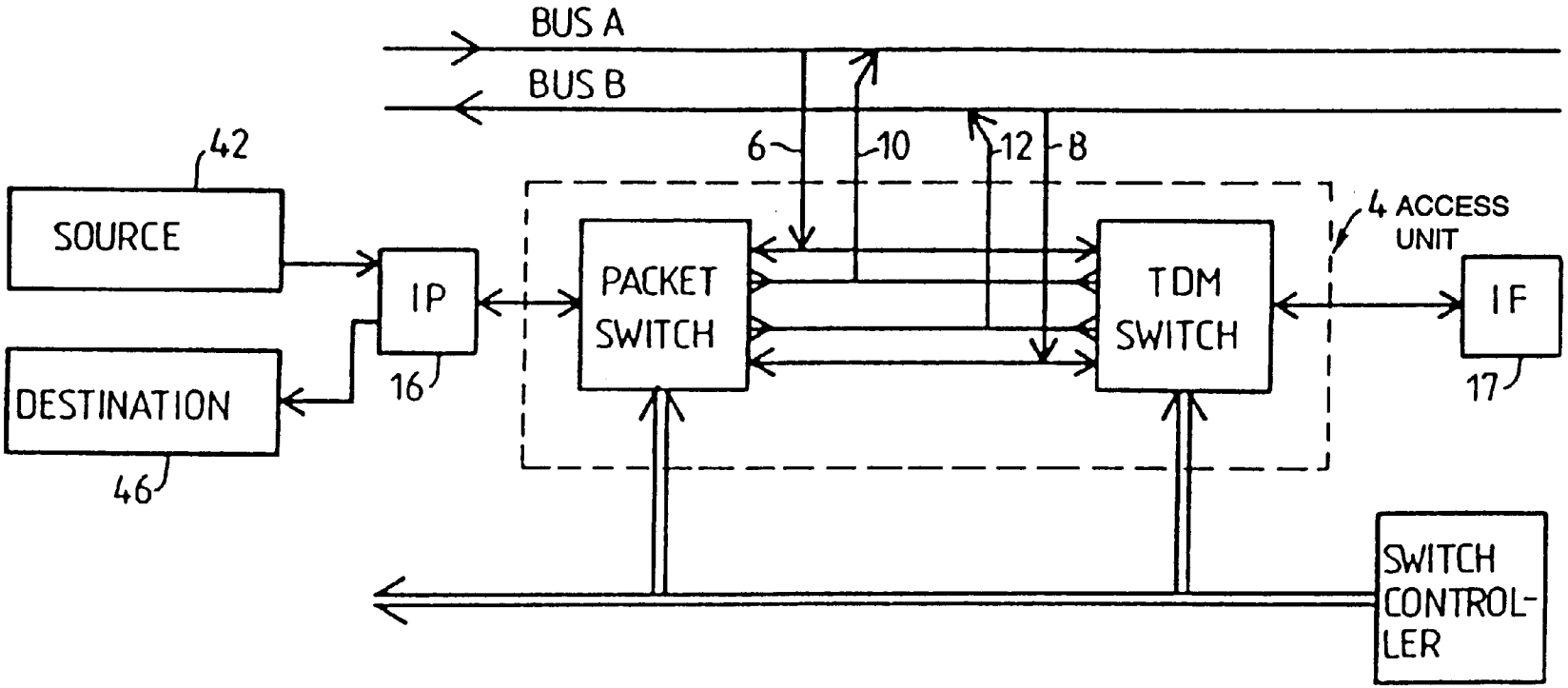
FIG. 4 is a block diagram of an access unit (AU) of the network shown in FIG. 3.

FIG. 3 illustrates in more detail the use of the segmentation and reassembly machines 48 and 50 in a QPSX network of the type disclosed in WO 86/03639. The QPSX network comprises two unidirectional buses, bus A and bus B with data flowing in opposite directions, a central controller 2 and a number of distributed nodes or access units (AU's) 4 coupled between the buses A and B. Although each bus originates and terminates at the central controller 2 neither has a through connection, in normal circumstances. Each AU 4 has read taps 6 and 8 from the respective buses and lines 10 and 12 connected to unidirectional write couplers to the respective buses. The write transmit only in the direction of propagation of the respective buses. The read connections for each AU are attached to the bus ahead of the write connections and consequently the information read by each AU is uneffected by that written by it. In the illustrated arrangement, a source 42 is coupled to one of the access units 4 via the segmentation machine 48. The access unit transmits the message in fixed length slots on the network to the access unit 4 associated with the destination 46. Normally each access unit would have both segmentation and reassembly machines 48 and 50 to enable two way communications. The segmentation and reassembly machines 48 and 50 can be regarded as part of the interface IP 16.

Figure 5:
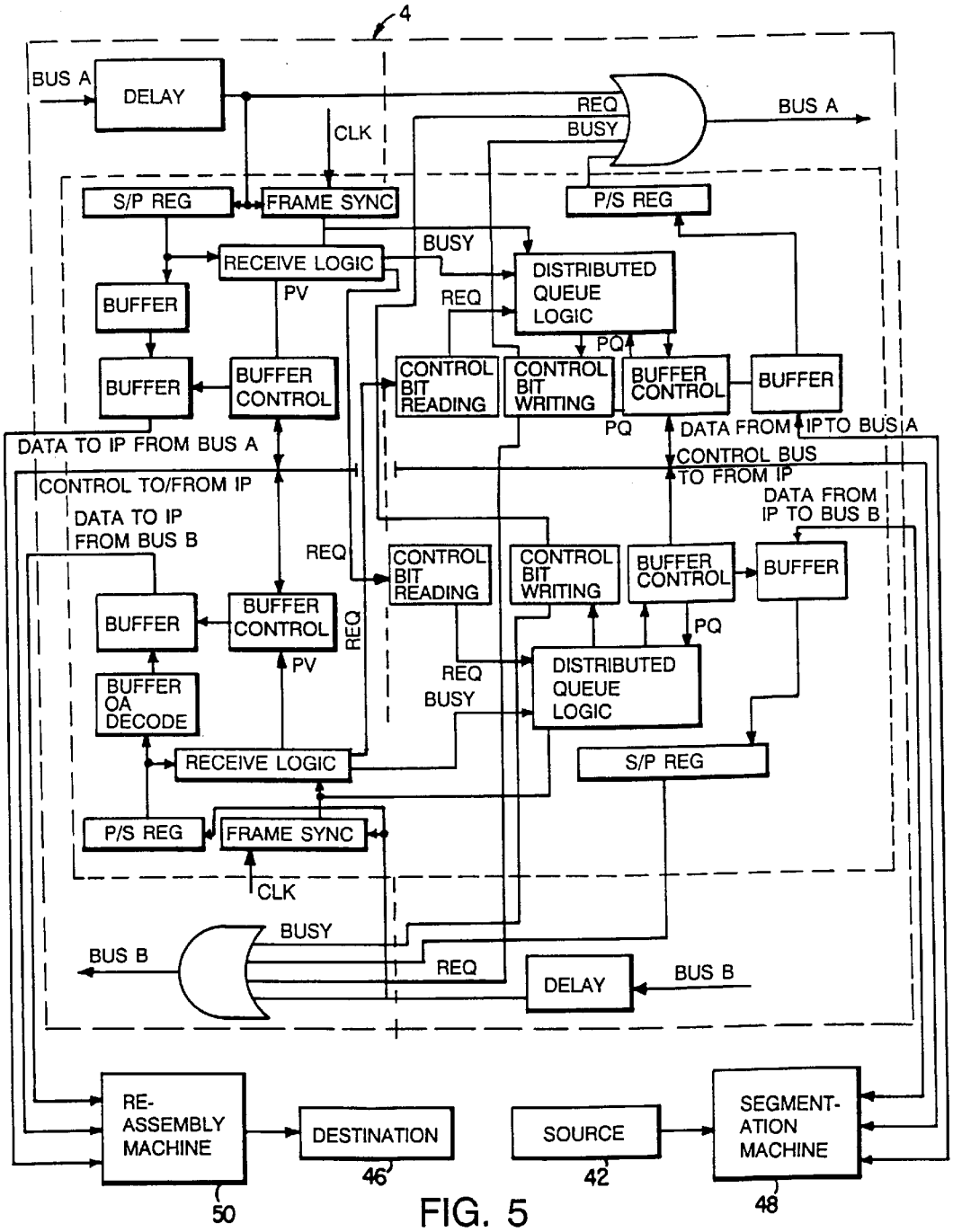
FIG. 5 is a more detailed block diagram of the access unit.

FIG. 5 shows in more detail the connection of the segmentation and reassembly machines 48 and 50 to an access unit 4 of the type described in the aforementioned publication. FIG. 5 corresponds generally to FIG. 12 of that specification and hence need not be described in more detail here.

Each node in the network will have one or more unique SI's. Each SI can be used by the node for the transfer of a message. When the message transmission is complete the SI can be reused. Multiple SI's for a single node allow that node to transfer more than one message concurrently.

To describe the operation of the message transfer scheme, the segmentation of the message into slots is considered first and the action at the receiver is considered after that.

The train of slots 32 sent by the segmentation machine 48 is shown in FIG. 1. The first slot of a multisegment message will be identified as such by a BOM (Beginning Of Message) code in the TYPE field 36. The SI field 36 is set by reference to the unique SI of the source node and the information field 40 contains the first segment of the message. Thus the DA field 22 of the message 20 is at the head of the information field 40. The following segments of the message until the last are each placed in the information fields of slots with the TYPE field 36 set to COM (Continuation Of Message) and the SI field 38 containing the source's code which is unique for this message. The last slot of a multisegment message has the TYPE field 36 coded as EOM (End Of Message), as shown.

For the transfer of a message 20 that only requires a single slot 32 the SSM (Single Slot Message) code is used in the TYPE field 36. The SI is not required in this case, however it is still used for consistency in operation.

Figure 6:
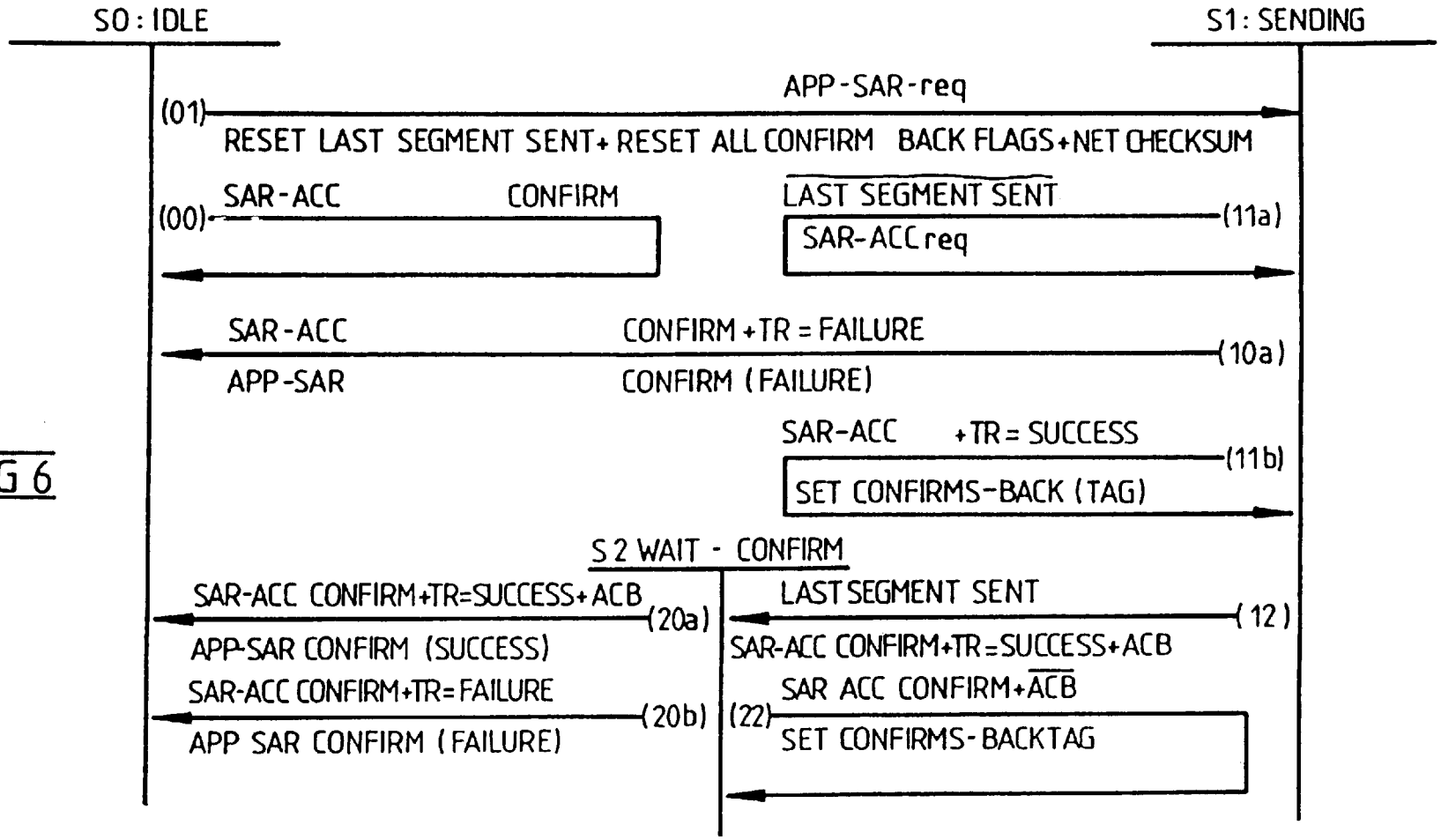
FIG. 6 is a segmentation state machine diagram.

An implementation of the segmentation machine 48 will now be described with reference to the state diagram which is shown in FIG. 6. In this diagram, the condition for a state transisition is shown above the transition line and the action taken is below the line, in accordance with standard notation. This state machine will handle the receipt of a message from a single source at a time. If simultaneous receipt of more than one message is required, multiple state machines would be required.

To specify the communications between adjacent parts of the system, there are three communications primitives, as follows:

(i) Request (REQ): This is a request to send a unit of data, (ii) Indication (IN): This is an indication that a unit of data has been received, and (iii) Confirmation (CONFIRM): This is a confirmation that a unit of data has been sent without error.

Between the machines 48 and 50 and the fast packet switch 44, (via the access units 4) communication primitives are prefixed by SAR_ACC hence there are three communication primitives as follows:

SAR_ACC Request

SAR_ACC Indication

SAR_ACC Confirm.

Also for source or destination equipment 42 and 46 such as a computer attached to the segmentation and reassembly machines 48 and 50, communication primitives are prefixed by APP_SAR hence there are three communication primitives as follows:

$APP_{13}$SAR Request:

APP_SAR Indication

APP_SAR Confirmation

A segmentation machine operates on an unconfirmed APP SAR request, provided that sufficient resources are available. Tags for SAP_ACC requests and Source Identifiers (SIs) are common resources for all of these machines. Tags used in SAP_ACC requests are unique over all such requests from any segmentation machines. A tag is allocated on an SAR_ACC request and deallocated on an SAR_ACC confirm. The tag for the segments are local to the particular segment at the segmentation machine and is not transmitted on the network. Tags are reused when message transmissions have been completed. The tag is coded in TAG fields 52 and 54 in Request and Confirm primitives 56 and 58. The TAG fields 52 and 54 in the Request and Confirm primitives 56 and 58 are used for communications between the segmentation machine 48 and access unit 4, as seen in FIG. 7. The Request primative 56 comprises the TAG field 52, T-SEG field 60 together with the slot 32. The fields 60 and 52 are control fields which are not transmitted beyond the access unit 4. The Confirm primative 58 comprises a TAG field 54 and TR field 64, being control fields for communication between the access unit 4 and the segmentation machine 48. The codes in the TAG fields 52 and 54 must correspond for a particular segment 40. Therefore a particular message 20 will have a number of TAG codes corresponding to the various segments 32 required to be used for the transmission. Successful transmission or otherwise is indicated by the coding in the TR field 64.

Source Identifiers (SI) are selected at the source so that the SI will identify a unique message to any reassembly machine. The SI is allocated on an APP_SAR request and is deallocated in an implementation dependent manner.

One reasembly machine 50 is needed at the destination 46 for each SI. A reassembly packet timer (not shown) is also associated with each reassembly machine, to prevent locking in a wait state for signals.

An SAR_ACC confirm is routed to the segmentation machine which generated the SAR_ACC request. An SAR ACC indication is routed to the reassembly machine associated with the SI. The segmentation function of the segmentation machine 50 is described in the following paragraphs.

1.1 ABBREVIATIONS USED IN THE SEGMENTATION STATE DIAGRAM OF FIG. 6

| | |
|---|---|
| CONFIRMSBACK (TAG) | CONFIRMSBACK is an array of flags indexed by tag number. A CONFIRMSBACK flag is set when the SARACC confirm has heen received corresponding to the SARACC request with tag number TAG. |
| ACB: | All Confirms Back. Set if CONFIRMSBACK(1) is set for all segments. |
| CHECKSUM: | Flag for checking sum of bits successfully transmitted. |
| LAST SEGMENT SENT: | Flag indicating whether all segments for this message has been sent. |
| LAST SEGMENT SENT: | Flag indicating that not all segments for this message has been sent. |
| SI: | The source identifier from the segment in an SARACC indication. |
| TR: | The TR field 64 from the SARACC confirm indicates SUCCESS or FAILURE in the transmission of a segment. |
| TSEG: | The TSEG field 60 in the SAR ACC request indicates whether the segment is the first segment of the message (BOM), a continuing segment (COM), or the final segment (EOM). |

The states of the state machine diagram are as follows:

1.2 STATE S0:IDLE

State S0 is the initial state for all segmentation state machines. In this state, no APP_SAR request is outstanding from the source 42.

S(00) Idle—When an SAR_ACC confirm is encountered in the idle state for a previously confirmed message, the primitive is discarded with no state change.

S(01) Sending—An APP_SAR request causes the initiation of the machine and the transition to the Sending state. The segmentation machine will remain in the Sending state until the message has been sent and all expected responses have been received. A source identifier is allocated.

1.3 STATE S1: SENDING

In state S1, the segmentation machine transmits segments of the message until all segments have been transmitted.

S(10) Idle—The reception of a SAR_ACC confirm with TR=FAILURE indicates a problem with the tramsission. Sending is aborted and the machine, in transition to the idle state, discards outstanding SAR_ACC confirms. The source 42 is notified with an confirm (FAILURE) and the SI is deallocated.

S(11a) Sending—The segmentation machine forms segments from message data, sets the appropriate T SEG and causes an SAR_ACC request for each segment. The segmentation machine also checks the CHECKSUM for the messgage. If the last segment is sent it constructs the appropriately coded segment then sets flag indicating last segment sent.

S(12) Wait Confirm—All segments have been sent and SAR_ACC requests are outstanding. The segmentation machine waits for confirms on any outstanding SAR_ACC requests.

1.4 STATE S2: WAIT CONFIRM

In this state, the segmentation machine waits for expected SAR_ACC confirms.

S(20a) Idle—All SAR_ACC onfirms with TR=SUCCESS are received. An APP_SAR confirm (SUCCESS) is generated indicating a best effort was made of delivery. The SI is deallocated.

S(20b) Idle—SAR_ACC confirm with TR=FAILURE was received indicating the attempt at delivery was unsuccessful. An APP_SAR confirm (FAILURE) is generated indicating failure of delivery to the source 42. The SI is deallocated.

S(22) Wait Confirm—An SAR_ACC confirm with SUCCESS is recorded in the CONFIRMS_BACK array of flags.

The segmentation machine 50 described in the state diagram of FIG. 6 could be implementated by those skilled in the art using known logic blocks or by programming of micro-computers.

An implementation of the reassembly machine 50 will now be described with reference to the state machine diagram of FIG. 8.

2.1 ABBREVIATIONS USED IN THE REASSEMBLY MACHINE

RPT: Reassambly Packet Timer

SR RESOURCES AVAILABLE: Whether there are sufficient resources in the reassembly machine to allow this reassembly machine to exit the idle state.

CHECKSUM: Is a sum of all octects in a received message 20.

CHECKSUM GOOD: Indicates whether the checksum over message data matches with the value for CHECKSUM count at the segmentation machine 48 and transmitted to the re-assembly machine for error checking.

LENGTH: The number of octects in the message field in the SAR_ACC indication (BOM).

T_SEG: The T_SEG field in the SAR_ACC Indication indicates whether the slot 32 is the first segment of the message (BOM), a continuing segment (COM) or the final segment (EOM).

FIG. 9 diagrammatically illustrates the format for indication primitives for communications between the access unit 4 and the reassembly machine 50. In this case, the indication primitive 66 comprises a T_SEG field 68 and the slot 32. There is no need for any control communication between the reassembly 50 and the access unit 4.

2.2 STATE R0: IDLE

State R0 is the initial state for all reassembly machines. In this state, no message is being reassembled.

R(00a) Idle—An SAR_ACC indication presents a segment with SSM set. A single segment message is assembled. The checksum is computed and if no error is indicated, an APP_SAR Indication presents the complete message to the destination 46.

R(00b) Idle—An SAR_ACC Indication presents a segment with BOM set and sufficient resources are not available to allow the reassembly machine to leave the idle state.

R(01) Receiving—An SAR_ACC Indication presents a segment with BOM set and sufficient SAR resources are available to allow the reassembly machine to leave the idle state. Buffer allocated of size in octects equal to LENGTH indication. Resources are allocated and the data from the segment is buffered.

Figure 8:
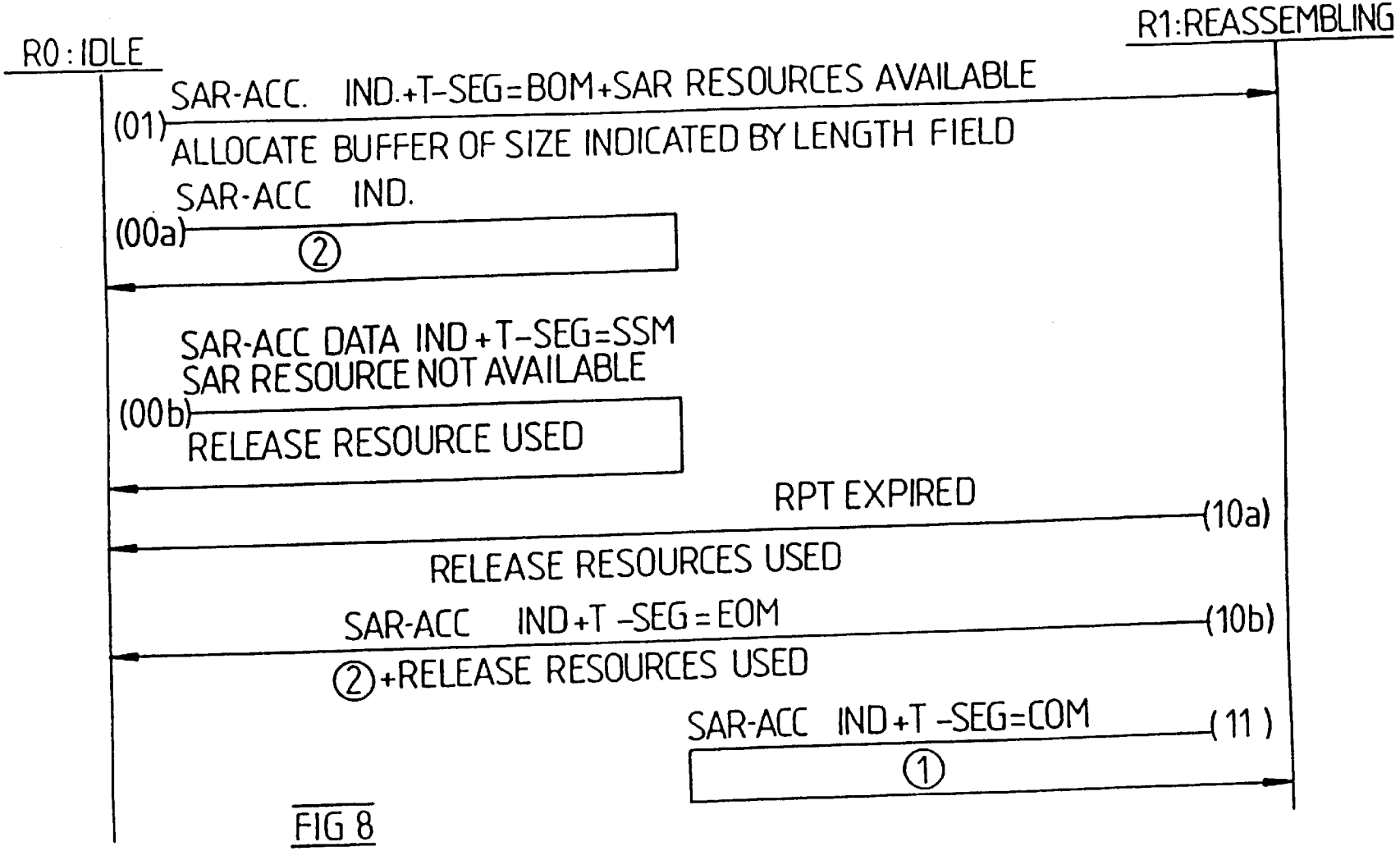
FIG. 8 is a reassembly state machine diagram.
Figure 10:
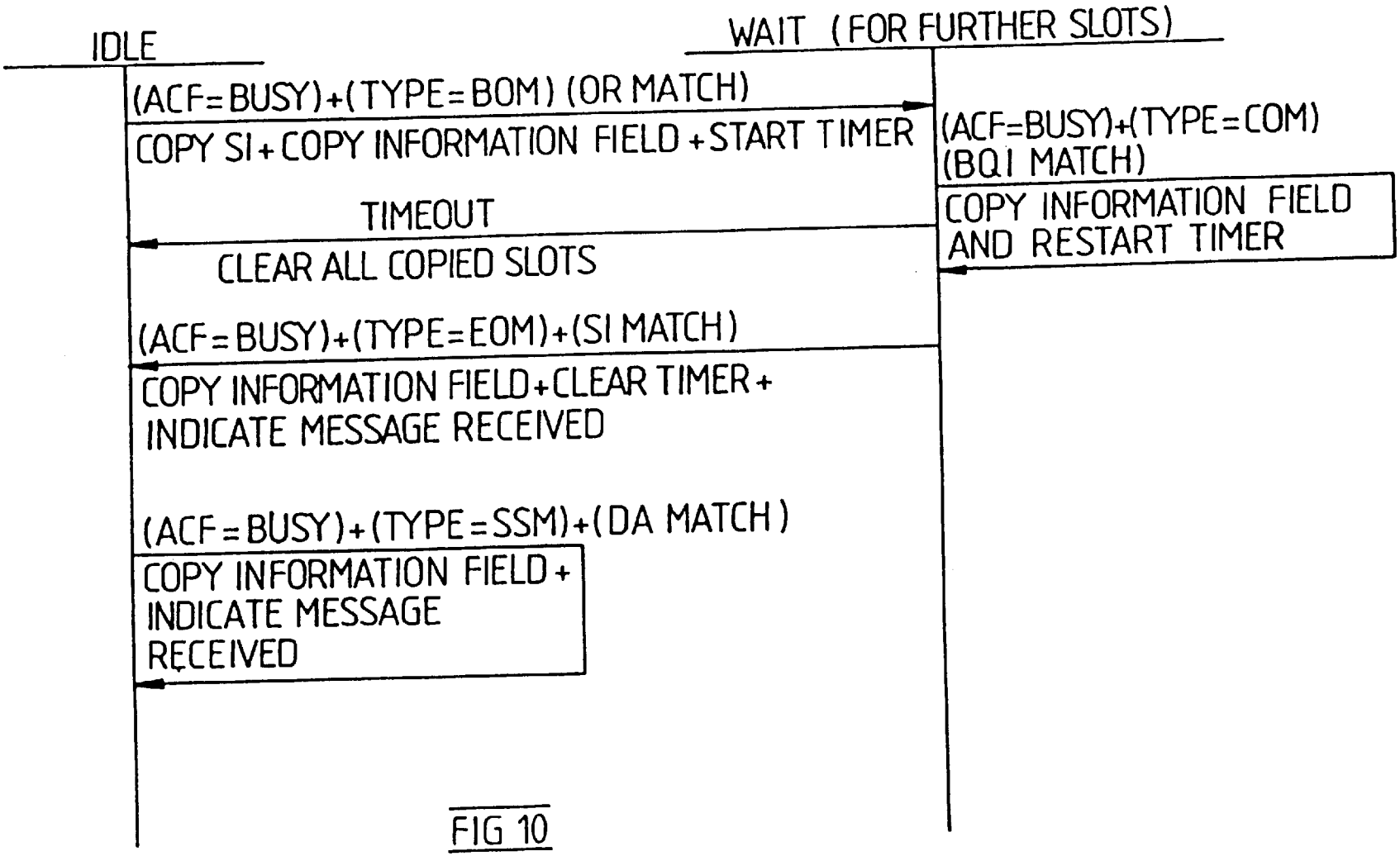
FIG. 10 is another reassembly state machine diagram.

In FIG. 8, Action 1 beneath the transition line (11) includes the steps of storing the received segment 32 in sequence and computing the CHECKSUM over the message 20. Action 2 in transition lines R0(00a) and R1(10b) includes of reassembling the message 20, computing the CHECKSUM over the message 20. If CHECKSUM IN GOOD then APP_SAR_IND, otherwise discard the message.

2.3 STATE R1: RECEIVING

In this state, the reassembly state machine is reassembling a message. The machine will remain in this state until the complete message has been assembled or until the Reassembly Packet Timer PRT has expired or there is a problem with available resources. The RPT ensures that the reassembly machine is not effectively put out of service waiting for a lost EOM.

R(10a) Idle—When the Reassembly Packet Timer expires, the reassambly machine will return to the idle state, discarding the partially assembled message.

R(10b) Idle—When the complete message has been assembled (EOM received) the reassembly machine computes the CHECKSUM. If the CHECKSUM indicates no error, an APP_SAR indication presents the received message to the destination 46. If the CHECKSUM indicates an error, the reassambly machine returns to the Idle state and releases resources.

R(11) Receiving—On each SAR_ACC indication with T_SEG=COM. the reassembly machine will buffer the segment in sequence.

The reassemble state machine diagram shown in FIG. 8 could be implemented in logic or by appropriate software.

FIG. 9 is another example of a state machine diagram for a reassembly machine which is particularly designed for use with the distributed queue system of the QPSX network disclosed in the aforementioned international publication.

This receive machine has two states: IDLE and WAIT. In the IDLE state the machine is not currently receiving any message. Thus in this state the machine will check for slots 32 with TYPE field 36 equal to BOM or SSM. In the case a BOM code is received the machine will check the DA in the information field. If the message is addressed to the station the machine enters the second state. In the case that SSM is detected in the IDLE state and the DA field matches, the length and information fields are copied and the AU 4 will indicate the higher layers that a message is received. The receive machine remains in the IDLE state after copying the slot. The higher layers refer to the higher layers in the Open System Interconnections (OSI) reference model.

The WAIT state is used to receive the slots 32 following the first of a multisegment message. In this state the slots with TYPE field 36 equal to COM and the SI equal to that copied from the first slot of the message will be received. The information fields of these following slots are concatenated to form the complete message. New messages addressed to the given station in this state are ignored by the state machine. Further receive machines are required if such messages are to be received. When the last slot of the message is detected by the receive state machine, the machine will copy the information field of the slot, indicating to the higher layers that a message is received and return to the IDLE state. This completes the receipt of the message. To guard against the loss of the EOM slot, which would cause the receive state machine to be locked in the WAIT state, the RPT timer is used. This timer is started after each BOM or COM slot is received. If the timer expires before the next slot is received, a failure in the transfer is assumed. The machine will then clear all copied slots and return to the IDLE state.

CONSTRAINED DESTINATION RESOURCES

In all practical implementations of destination facilities, i.e. resources such as buffers and processing capacity will be limited and loss of slots can occur unless a positive control mechanism is introduced to control communication between source and destination.

The method enables a source seeking use of the destination resources for reassembly of the original message to be temporarily held up until the required resources are available. The method implements a variety of access disciplines. Among others, the method supports first come first served queueing for the destination resources described briefly below.

Control of access to destination resources is via a "ticket" handout scheme in which the "ticket number" establishes the position of source request in a distributed queue. The first encapsulated segment of a message sent by a source is considered by the destination as a request for resources. A "go ahead" message is returned to the source if the required resources are available, otherwise a "ticket" which uniquely identifies the sources position in a distributed queue of requests is returned. When resources become available the destination broadcasts the "ticket number" of the next source to be serviced. Under the assumption that resources are usually available, the delay incurred in waiting for the "go-ahead" is avoided by the source continuing to send segments of a message while it awaits the reply from the destination. In the case of a negative reply, that is a "ticket" is received, the source aborts transmission of further segments and resets its transmission pointer to the first segment. Thus the source buffers each message until it can be completely sent.

The TYPE field is used to control the generation of new ticket number and thereby enables various resources access priority schemes to be implemented. The TYPE field is also used to indicate whether slots from part of a message whose transfer is guaranteed.

Figure 11:
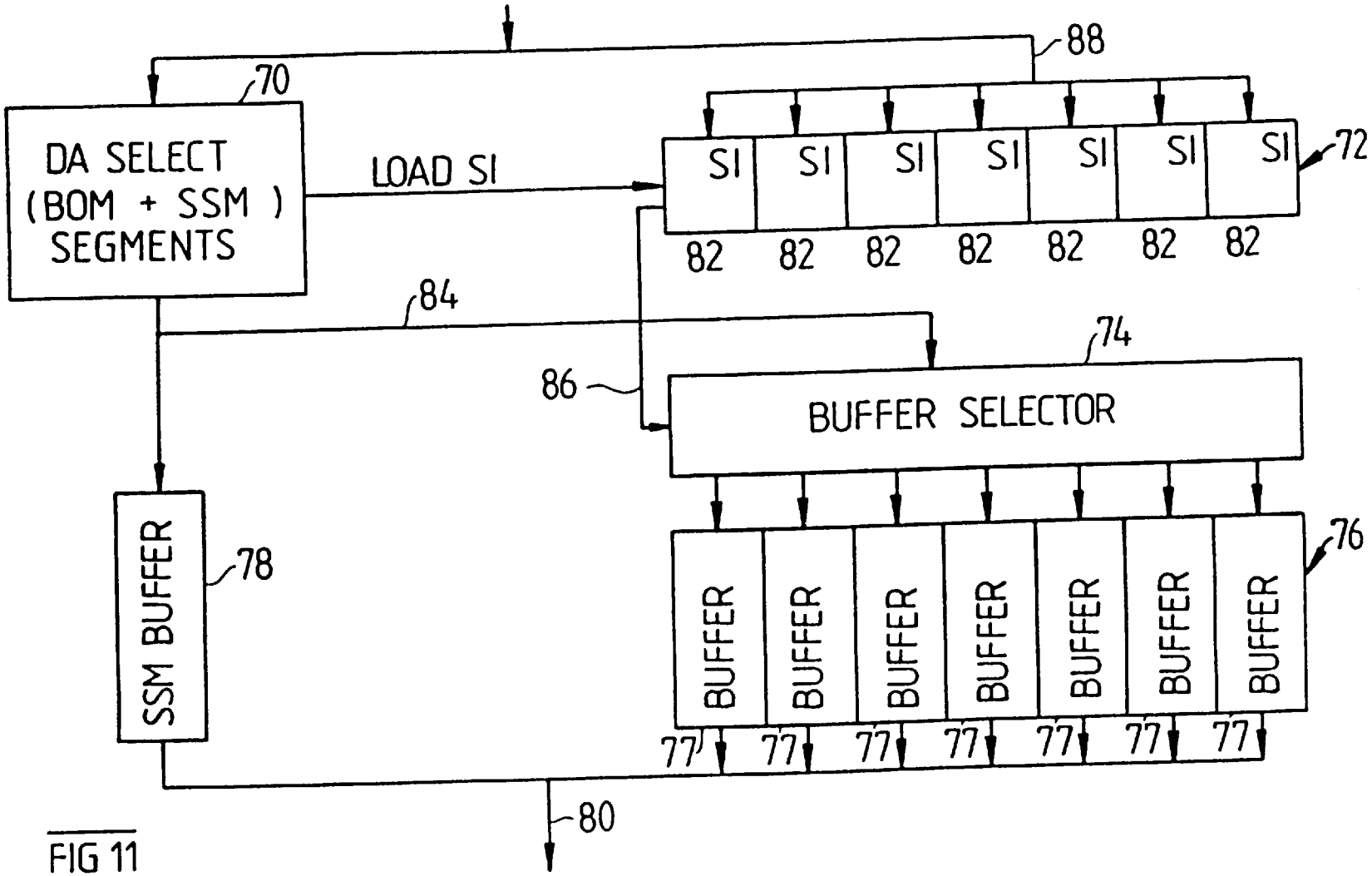
FIG. 11 is a block diagram of a reassembly machine.

FIG. 11 is a block diagram showing an implementation of a reassembly machine 50. In this example, the machine is designed to simultaneously handle seven messages and can therefore be regarded as a seven-fold implementation of the reassembly machine which is described in the state machine diagram of FIG. 8. The machine is also able to simultaneously receive a single segment message.

The machine comprises a DA Select circuit 70 which receives fixed length slots 32 from an access unit 4. The circuit includes an SI comparator block 72 which also receives the slots 32 from the access unit 4. Output from the comparator block 72 is connected to the input of a buffer selector circuit 74. Outputs from the buffer selector 74 are coupled to buffers 77 of a partitioned buffer space 76. The circuit also includes an SSM buffer 78 which receives output from the DA select circuit 70. Outputs from the buffer 78 and buffers 77 are transferred to the destination 46 on output line 80, in the form of a reassembled variable length message 20.

The main function of the DA select circuit 70 is to check the destination address within the BOM and SSM segments copied from the slots 32 received by the access unit 4. If the destination address matches that of the access unit then the DA select circuit 70 will initiate the receipt and reassembly of the whole message provided resource is available to do so.

The SI (Source Identifier) comparator block 72 comprises seven identical sub-blocks (actually any number of sub-blocks may be used. The number of sub-blocks specifies the number of multiple segment messages 20 that may be reassembled simultaneously). The function of an SI_Comp sub-block 82 is to copy all segments 40 with the same SI code in the header of the slot 32. In this way all segments 40 of a message 20 are received and allows the message to be reassembled. When there are more messages destined to an access unit than there are SI_Comp sub-blocks 82, the extra messages will be lost.

The buffer selector 74 is a simple function that directs where a copied segment should be stored. This block operates under the control of the SI comparator circuit 72. Whenever any sub-block 82 detects that a segment should be received the buffer selector 74 is directed to copy that segment into the associated buffer 77.

The buffers 77 are used to store segments 32 while messages are being reassembled. The SSM buffer 78 is used to store all single segment messages. Single segment messages do not need reassembly since the complete message is contained within the one segment. Hence the segment is copied directly to the SSM buffer 78. From there it may be passed out as a reassembled message 20 to the attached destination 46.

The seven buffers 77 of the buffer space 76 are each uniquely associated with an SI_Comp sub-block 82 and each used to store all segments 40 of a common message 20. Each buffer partition must be of sufficient size so as to receive all segments of a message in order to guarantee that no part of the message is lost. When all segments of a message are received in a buffer partition then the complete variable length message may be passed out of the buffer. When the message is passed out, the SI_Comp sub-block 82 associated with that buffer partition can be made free and hence used to receive another message.

To further describe the operation of the reassembly machine it is useful to consider the data flow paths through the machine when a slot is passed to the machine from the network. A fixed length slot 32 copied from the access unit 4 will enter both the DA Select circuit 70 and comparator block 72. The DA Select circuit 70 will temporarily store the full slot 32. Each of the sub-blocks 82 will only copy the SI field 38 of the slot.

The DA select circuit 70 will check the type field 36. If the type is COM or EOM then the only action on the segment is to store it temporarily, in case it needs to be transferred to the SI_Comp block 72. If the type is BOM or SSM then the DA Select circuit 70 will check the DA address field 22 within the data segment 32. If the DA address does not match that of the access unit 4, then the segment is discarded. If the DA address does match that of the access unit then the segment is intended for that unit. If the segment is an SSM then the message part of it will be passed directly to the single segment buffer 78. Hence the complete message is received and no further action is required by the reassembly machine except to pass it out as a reassembled message.

If the segment received by the DA select circuit 70 is a BOM with a DA match then the circuit 70 will check if there are any free SI_Comp sub-blocks 82 available to control the receipt of the rest of the segments of the message. If not the segment is discarded. This event occurs when the reassembly machine is already receiving messages on all sub-blocks. This extra message is hence lost.

If there is an SI_Comp sub-block 82 available then the DA select circuit 70 will copy the SI from the segment and load it into the free SI_Comp sub-block 82, hence making that sub-block busy. The segment information field 40, that is the slot 32 minus the segment header fields 34, 36 and 38 is then passed via line 84 to the buffer selector circuit 70. The buffer selector ciruit 76 in turn routes the segment 40 into the buffer 77 associated with the claimed SI Comp sub-block 82. The association is signalled explicity to the buffer selector circuit 74 from the SI_Comp block 82 via line 86.

For COM and EOM segments, that is the segments following the first of a message, the decision to copy these into the buffer is made by the SI_Comp circuit 72. Each sub-block 82 will compare the SI read from the incoming slot via line 88 with its own SI. If no sub-block has a match for the incoming SI then the segment is discarded. If there is a match, the information segment 40 is passed from the temporary storage in the DA select circuit 84 via line 84 to the sub-block 82. As with a BOM segment the buffer selector circuit 74 will route the segment to the buffer partition associated with the SI_Comp sub-block 82 that had a match for the SI. If the segment passed to the buffer partition is an EOM segment the reassembly of that message is complete. Hence the SI_Comp sub-block 82 is made free and the complete message passed out along line 80.

Figure 12A:
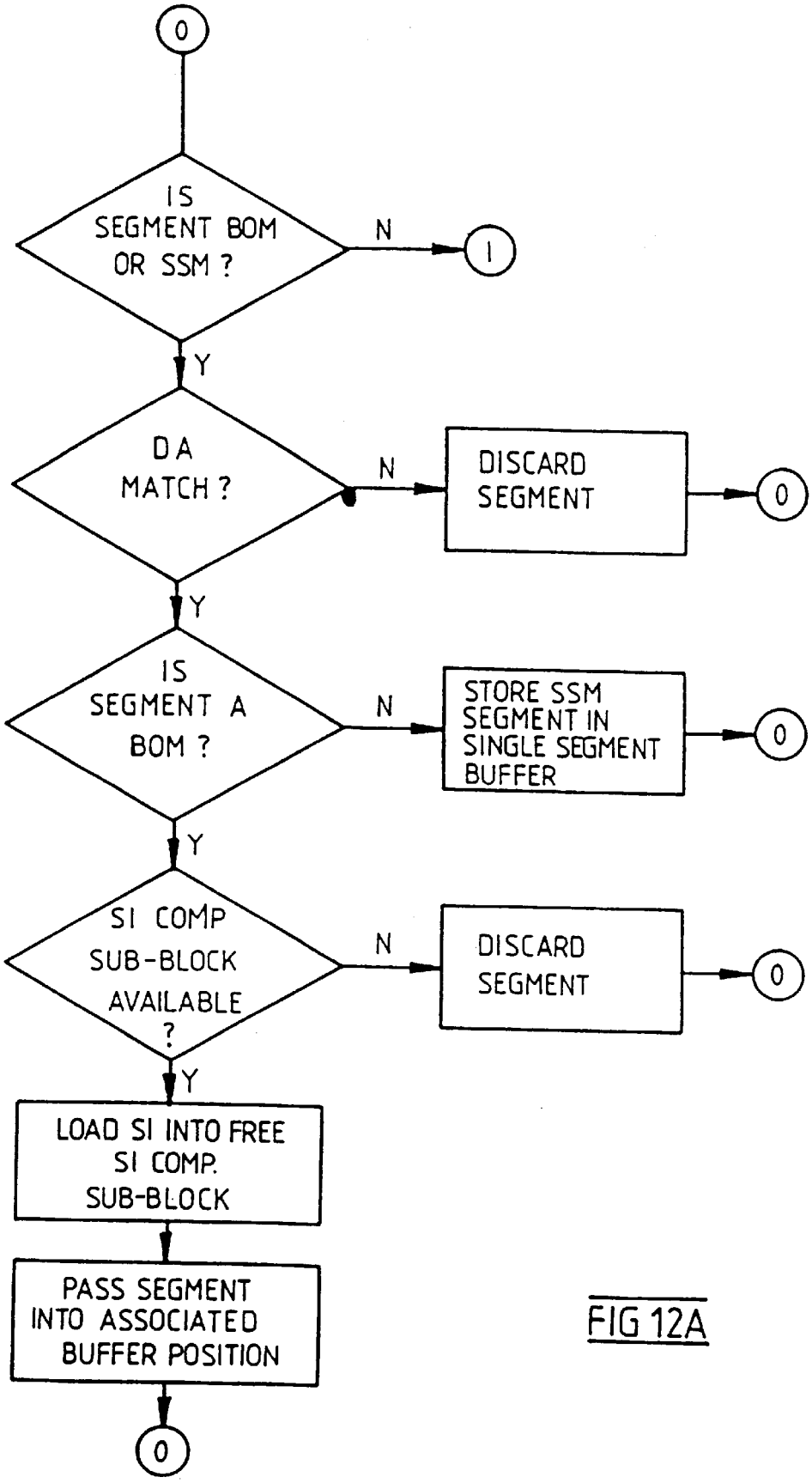
FIGS. 12A and 12B are flowcharts illustrating logical operations in the reassembly machine.
Figure 12B:
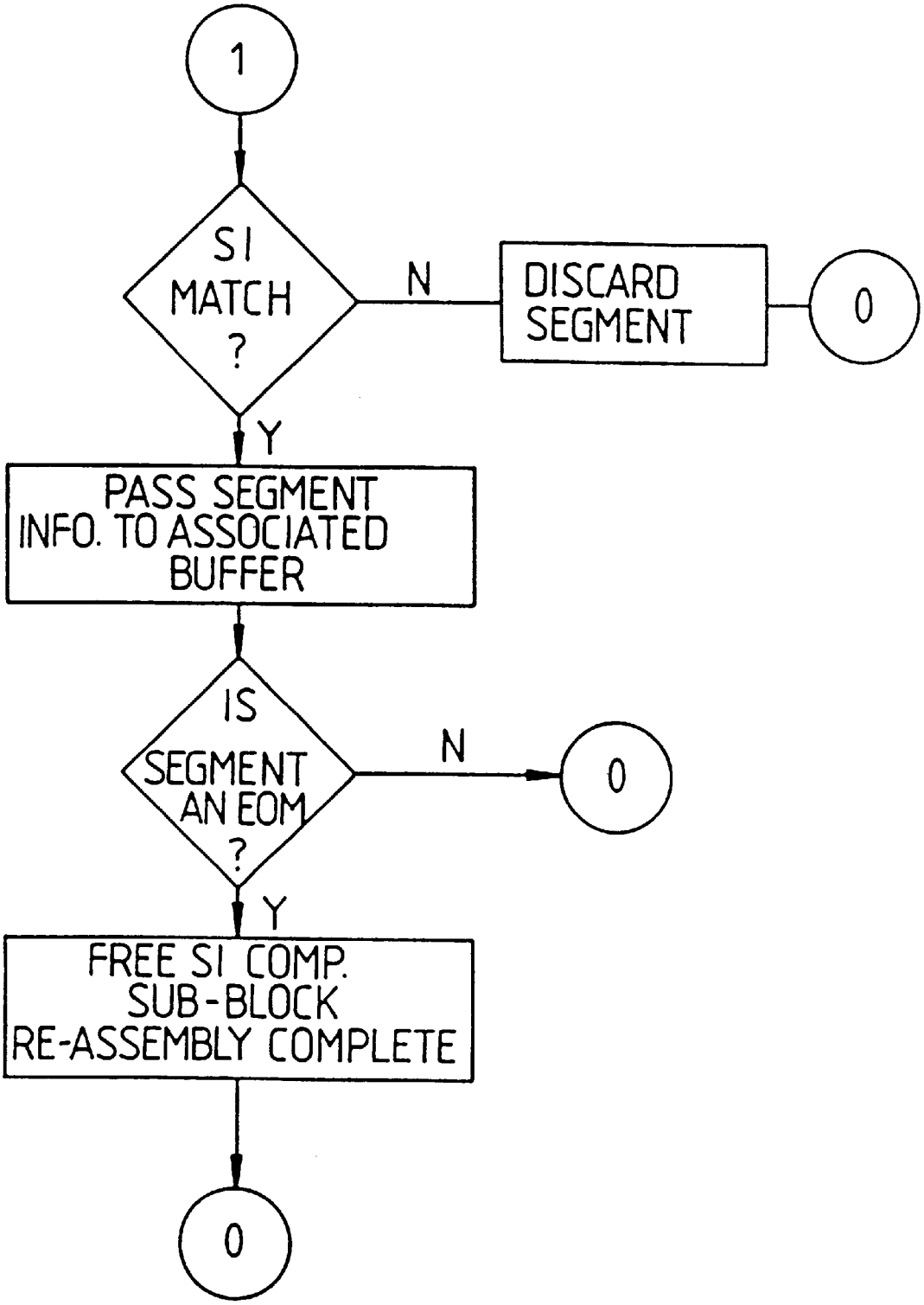

FIGS. 12a and b are flow charts which illustrate the logical steps involved in the reassemble machine 50, illustrated in FIG. 11.

Many modification will be apparent to those skilled in the art without departing from the spirit and scope of the invention.

The claims defining the invention are as follows:

1. A method of transmitting variable length messages on a network from a source having a source address to a destination having a destination address, said method including the steps of:

segmenting each message into a plurality of fixed length slots including a first slot, continuing slots, and a last slot, [each] of said slots including a header field which includes a source identifier field, which is substantially shorter than said destination address, and a message segment;

providing a source identifier code in the source identifier field, each source identifier code being uniquely associated with the message to be transmitted;

entering said destination address in the message segment of said first slot;

transmitting the slots on the network; and controlling reassembly of slots at the destination in accordance with the source identifier code of slots received at the destination.

2. A method as claimed in claim 1, including the step of providing [the] *a* type field in the header field of each slot, and coding into the type field a first, second or third code representing a beginning of message, a continuation of message and an end of message respectively and controlling the reassembly of received slots at the destination in accordance with the first, second and third code.

3. A method as claimed in claim 2, wherein the method includes the step of storing message segments associated with a single message in a buffer at the destination.

4. A method as claimed in claim 3, wherein if said first code is detected at the destination, the source identifier code is inputted to a comparator and if said second code associated with a subsequently received slot is detected the source identifier thereof is also inputted to the comparator to check for a match, and if a match occurs the message segment of the subsequently received slot is stored in said buffer.

5. A method as claimed in claim 4, wherein if said third code is detected a reassembled message in the buffer is outputted from the buffer.

6. A method as claimed in claim 2, including the step of coding into the type field a fourth code representing a single segment message and if said fourth code is detected in a slot received at the destination, the message segment thereof is stored in a single segment buffer.

7. A method as claimed in claim 5, including the step of providing multiple comparators and buffers at the destination so as to enable simultaneous receipt of a plurality of messages each having its own source identifier code, the message segments of each message being stored in a single buffer.

8. A method as claimed in claim 1, including the step of concurrently transmitting two or more messages from the source to the destination on the network.

9. Apparatus for transmitting variable length messages on a network from a source having a source address to a destination having a destination address in fixed length slots, said apparatus including:

a segmentation machine for segmenting each message into a plurality of fixed length slots including a first slot, continuing slots, and a last slot, each of said slots including a header field which includes a source identifier field which is substantially shorter than said destination address, and a message segment, coding means for providing a source identifier field including a source identifier code which is uniquely associated with the message to be transmitted, means for entering said destination address in the message segment of said first slot, and a reassembly machine located, in use, at the destination, said reassembly machine including control means for controlling reassembly of slots in accordance with the source identifier codes of the slots.

10. Apparatus as claimed in claim 9, wherein said coding means provides a type field in the header field of each slot and provides a first, second or third code representing a beginning of message, a continuation of message and an end of message, respectively, and wherein the control means is responsive to said first, second and third codes.

11. Apparatus as claimed in claim 10, wherein said reassembly machine includes detecting means for detecting in the header fields of the received slots the presence of the third code and for detecting a match between the destination address in the slot and the destination address of the destination, and wherein if there is an address match, the detecting means copies the source identifier code into a comparator means.

12. Apparatus as claimed in claim 11, wherein the reassembly machine includes a plurality of said comparator means to enable concurrent receipt of slots of different messages.

13. Apparatus as claimed in claim 12, including means inputting the source identifier codes of received slots to said plurality of comparator means to thereby enable matching of slots having the same source identifier codes.

14. Apparatus as claimed in claim 13, including a plurality of buffers for the message segments of the sots and a buffer selector circuit which selects a particular buffer for receipt of all message segments of slots having the same source identifier code whereby reassembled messages are stored in said buffers.

*15. A method of transmitting variable length messages on a network from a source to a destination, said method including the steps of segmenting each message into a plurality of fixed length slots each of which slots includes a header field and a message segment, providing a source identifier field in the header field of each slot, said source identifier field including a source identifier code that is uniquely associated with the message to be transmitted, transmitting the slots on the network, controlling the reassembly of slots at the destination in accordance with the source identifier codes of the slots received at the destination, and providing a type field in the header field of each slot, and coding into the type field a code selected from a first code, a second code and a third code, respectively representing a beginning of message, a continuation of message or an end of message, and controlling the reassembly of received slots at the destination in accordance with said source identifier codes and the first code, the second code and the third code.*

*16. A method as claimed in claim 15 wherein the message includes a destination address field that is checked for a match with an address associated with the destination, and wherein the address field is transmitted in the message segment of the first slot used to transmit the message.*

*17. A method as claimed in claim 15 or 16 wherein the method includes the step of storing message segments associated with a single message in a buffer.*

*18. A method as claimed in claim 17 wherein if said first code is detected at the destination, the source identifier code is inputted to a comparator and if the second code associated with a subsequently received slot is detected the source identifier thereof is also inputted to the comparator to check for a match, and if a match occurs the message segment of the subsequently received slot is stored in said buffer.*

*19. A method as claimed in claim 18 wherein if said third code is detected the reassembled slots in the buffer are outputted from the buffer as a reassembled message.*

*20. A method as claimed in claim 19 including the step of providing multiple comparators and buffers at the destination so as to enable simultaneous receipt of a plurality of messages each having its own source identifier code, the message segments of each message being stored in respective buffers.*

*21. A method as claimed in claim 15 including the step of coding into the type field a fourth code representing a single segment message and if said fourth code is detected in a slot received at the destination, the message segment thereof is stored in a single segment buffer.*

*22. Apparatus for transmitting variable length messages on a network from a source to a destination in fixed length slots said apparatus including;*

*a segmentation machine for segmenting the messages into fixed length slots, each of said slots includes a header field and a message segment, said segmentation machine including coding means for providing a source identifier field in the header of each slot, the source identifier field being substantially shorter than any associated destination address, said source identifier field including a source identifier code that is uniquely associated with the message to be transmitted, and a reassembly machine located, in use, at the destination, said reassembly machine including control means for controlling reassembly of slot in accordance with the source identifier codes of the slots.*

*23. Apparatus as claimed in claim 22 wherein said coding means provides a type field in the header field of each slot and provides a code selected from a first code, a second code and a third code, respectively representing a beginning of message, a continuation of message and an end of message, and wherein the control means is responsive to said source identifier codes and said first code, said second code and said third code.*

*24. Apparatus as claimed in claim 22 or 23 wherein the message includes a destination address field and wherein the segmentation machine is arranged to transmit the destination address field in the message segment of the first slot of the message.*

*25. A method of transmitting variable length messages on a network from a source having a source address to a destination having a destination address, said method including the steps of:*

*segmenting each message into a plurality of fixed length slots including a first slot, continuing slots, and a last slot, each of said slots including a header field that includes a source identifier field, which is substantially shorter than said destination address, and a message segment;*

*providing a source identifier code in the source identifier field, said source identifier code being uniquely associated with the message to be transmitted;*

*transmitting the slots on the network; and*

*controlling reassembly of slots at the destination in accordance with the source identifier codes of the slots received at the destination.*

*26. Apparatus for transmitting variable length messages on a network from a source having a source address to a destination having a destination address in fixed length slots, said apparatus including:*

*a segmentation machine for segmenting each message into a plurality of fixed length slots including a first slot, continuing slots, and a last slot, each of said slots including a header field that includes a source identifier field that is substantially shorter than said destination address, and a message segment;*

*coding means for providing the source identifier field with a source identifier code that is uniquely associated with the message to be transmitted; and*

*a reassembly machine located, in use, at the destination, said reassembly machine including control means for controlling reassembly of slots in accordance with the source identifier codes of the slots.*

*27. A method for the connection oriented transfer of variable length messages (20) on a network having a plurality of nodes (4) from a source node (42) having a source address (24) to a destination node (46) having a destination address (22), said method including the steps of:*

*segmenting each message (20) into a plurality of fixed length slots (32) including a first slot, continuing slots and a last slot, each of said slots including a header field (34, 36, 38) and a message segment (40);*

*transmitting the slots from the source node to the network; and*

*controlling reassembly of slots received at the destination node into the message on the basis of information in the header field;*

*a source identifier code (SI) uniquely associated with the message to be transmitted from the source node being provided in a source identifier field in the header field of each of said slots; and*

*said reassembly of slots at the destination node being controlled in accordance with the source identifier code of slots received at the destination node.*

*28. A method as claimed in claim 27 including the step of providing a type field (36) in the header field of each slot, and coding into the type field a code representing an end of message (EOM) and controlling the reassembly of received slots (32) at the destination node in accordance with said code.*

*29. A method as claimed in claim 28 including the step of storing message segments (40) associated with a single message in a buffer (77) at the destination node.*

*30. A method as claimed in claim 29 wherein the source identifier code (SI) of the first slot received at the destination node is inputted to a comparator (82) and the source identifier code (SI) of each subsequently received slot is also inputted to the comparator to check for a match, and if a match occurs, the message segment (40) of the subsequently received slot is stored in said buffer (77).*

*31. A method as claimed in claim 30 wherein if one of said codes is detected, the reassembled message (20) in the buffer (77) is outputted from the buffer (77).*

*32. A method as claimed in claim 30 or 31 including the step of providing multiple comparators (82) and buffers (77) at the destination node so as to enable simultaneous receipt of a plurality of messages (20) each having its own source identifier code (SI), the message segments (40) of each message (20) being stored in a single buffer (77).*

*33. Apparatus for the connection oriented transfer of variable length messages (20) on a network having a plurality of nodes (4) from a source node (42) having a source address to a destination node (46) having a destination address in fixed length slots (32), said apparatus including:*

*a segmentation machine (48) located, in use, at the source node, for segmenting each message (20) into a plurality of fixed length slots (32) including a first slot, continuing slots and a last slot, each of said slots including a header field (34, 36, 38) and a message segment; and*

*a reassembly machine (50) located, in use, at the destination node, said reassembly machine including control means for controlling reassembly of slots (32) in accordance with information in the header field;*

*coding means for providing a source identifier field (38) in the header field of each slot including a source identifier code (SI) which is uniquely associated with the message (20) to be transmitted; and*

*the control means being adapted to control reassembly of the slots into the message in accordance with the source identifier codes (SI) of the slots.*

*34. Apparatus as claimed in claim 33, wherein said coding means provides a type field (36) in the header field of each slot and provides a further code representing an end of message (EOM) and wherein the control means is operative to control reassembly of the slots to a reassembled message.*

*35. Apparatus as claimed in claim 34 wherein the control means includes selector means (70) for checking said further code in the header field of the slots and for inputting the source identifier codes (SI) to comparator means (82) for checking for matches with subsequently received source identifier codes.*

*36. Apparatus as claimed in claim 35, wherein the reassembly machine (50) includes a plurality of said comparator means (82) to enable concurrent receipt of slots of different messages.*

*37. Apparatus as claimed in claim 36, including means for inputting the source identifier codes (SI) of received slots to said plurality of comparator means (82) to thereby enable matching of slots having the same source identifier codes (SI).*

*38. Apparatus as claimed in claim 37, including a plurality of buffers (77) for the message segments of the slots and a buffer selector circuit which selects a particular buffer for receipt of all message segments of slots having the same source identifier code (SI) whereby reassembled messages are stored in said buffers.*

*39. Apparatus as claimed in claim 35 wherein, if the selector means (70) detects a further code representing the end of a message (EOM), the control means operates to output a reassembled message from the buffer (77) which is associated with the source identifier code (SI) of the slot containing said detected further code.*

* * * * *

UNITED STATES PATENT AND TRADEMARK OFFICE

CERTIFICATE OF CORRECTION

PATENT NO. : RE 37,494 E
DATED : January 1, 2002
INVENTOR(S) : Antonio Cantoni and Robert M. Newman It is certified that error appears in the above-identified patent and that said Letters Patent is hereby corrected as shown below:

Claims 15-39 should be deleted.

Signed and Sealed this

Eleventh Day of May, 2004

JON W. DUDAS
*Acting Director of the United States Patent and Trademark Office*

UNITED STATES PATENT AND TRADEMARK OFFICE

CERTIFICATE OF CORRECTION

PATENT NO. : RE 37,494 E
DATED : January 1, 2002
INVENTOR(S) : Antonio Cantoni and Robert M. Newman It is certified that error appears in the above-identified patent and that said Letters Patent is hereby corrected as shown below:

Column 1,
Line 7, insert -- An application for divisional reissue of this patent was filed on July 31, 2001, as U.S. application 09/919,725. That application is currently pending. --.

Column 11,
Line 55, "[each] of said slots" should read -- each of said slots --.
Line 60, "each source identifier code" should read -- said source identifier code --.

Column 13, line 15 - Column 16, line 46,
Claims 15-39 should be deleted.

This certificate supersedes Certificate of Correction issued May 11, 2004.

Signed and Sealed this

Twenty-eighth Day of February, 2006

JON W. DUDAS
*Director of the United States Patent and Trademark Office*